Nov. 24, 1931.  F. L. HAZELQUIST  1,833,486
BREAD AND CAKE BOX
Filed Jan. 7, 1929

INVENTOR
F. L. Hazelquist
BY
ATTORNEY

Patented Nov. 24, 1931

1,833,486

UNITED STATES PATENT OFFICE

FRED L. HAZELQUIST, OF STOCKTON, CALIFORNIA

BREAD AND CAKE BOX

Application filed January 7, 1929. Serial No. 330,845.

This invention relates to bread and cake containers for domestic use, such as are provided for keeping such bakery goods in a fresh condition and away from the possibility of damage and contamination by mice and the like.

The principal object of my invention is to provide a device of this general character having a lid composed primarily of wood, arranged to serve both as a lid and a bread cutting board. Another object is to provide the lid with means for engagement with a loaf so arranged that when the lid is opened the loaf will be automatically moved out onto the lid in cutting position; and when the lid is again closed the loaf will be deposited in a definite position in the box.

A further object is to provide means for holding a loaf cutting knife in such a manner that the knife may be permanently kept in connection with the box and so that when the lid is closed the knife will be concealed and when the lid is opened to assume its cutting board position the knife will then be in such a position to enable it to be easily grasped and removed from its holding means.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the box comprises a bottom 1 preferably of metal and side and top and back portions 2 also preferably of sheet metal and arranged to leave the front of the box freely open.

The depth of the box is preferably slightly greater than the width of two standard bread loaves, the width is somewhat greater than the length of one such loaf and the height is sufficiently greater than the height of the loaf to leave room for an upper screen or foraminous shelf 3, above the loaf retaining compartment so as to hold cakes and the like which are of lesser height than bread loaves.

Figure 3:
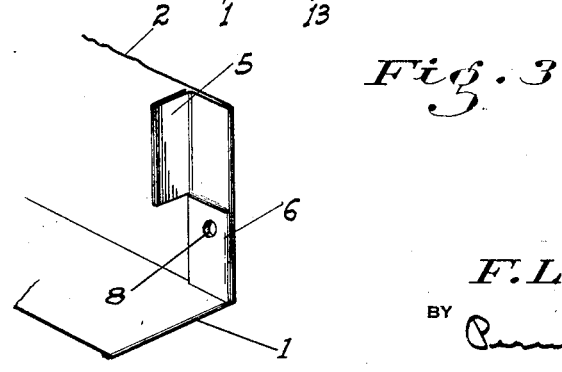
Fig. 3 is a fragmentary perspective view of the box showing the special feature of construction of the same at the front and bottom.

The combined lid and cutting board member 4 is of a size to fit snugly between the front edges of the member 2, so that when said lid is raised to a closed position its outer surface will be flush with said edges. The lid is prevented from further movement into the box by a flange 5 extending continuously around the member 2 inwardly of the opening-area, said flange being formed by bending the metal upon itself in a suitable manner such as is plainly shown in Fig. 3. At the bottom of the box the metal thicknesses of the flange are cut through horizontally and the flange portions are bent outwardly to lie in contact with the adjacent side portions of the member 2 as indicated at 6. This provides a quadruple thickness of metal at these points which gives sufficient bearing surface for the pivotal trunnions 7 of the lid which are preferably in the form of screws which project from the outside of the box through holes 8 drilled in the portions 6 and are screwed into the opposite side edges of the lid. A spring catch member 9 is mounted on top of the box to engage and hold the lid from opening movement when the same is raised to a closed position. The lid also has outwardly projecting feet or casters 10 toward its outer or free end which serve to maintain the lid horizontally disposed when opened and lowered, and also serve as handle means to initially move the lid to an open position when the catch 9 is released.

Figure 1:
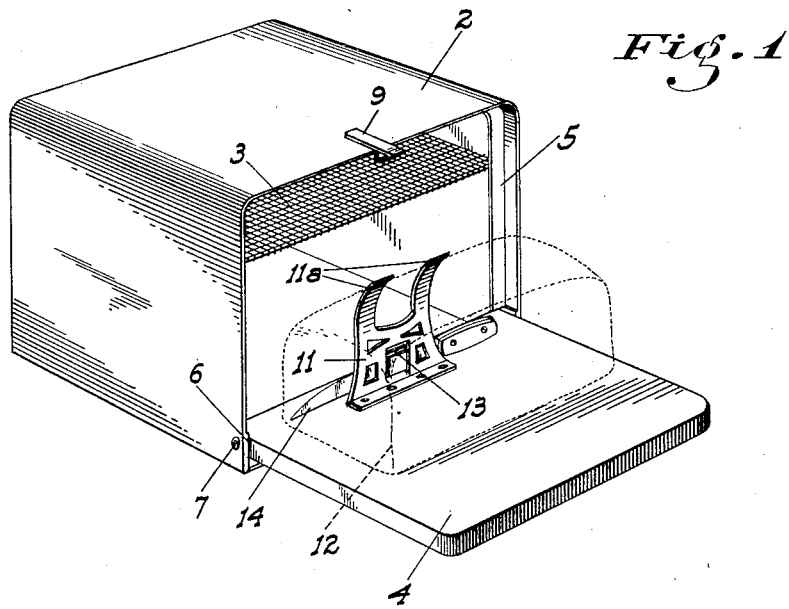
Fig. 1 is a perspective elevation of my improved box showing the lid open and in position to serve as a cutting board.
Figure 2:
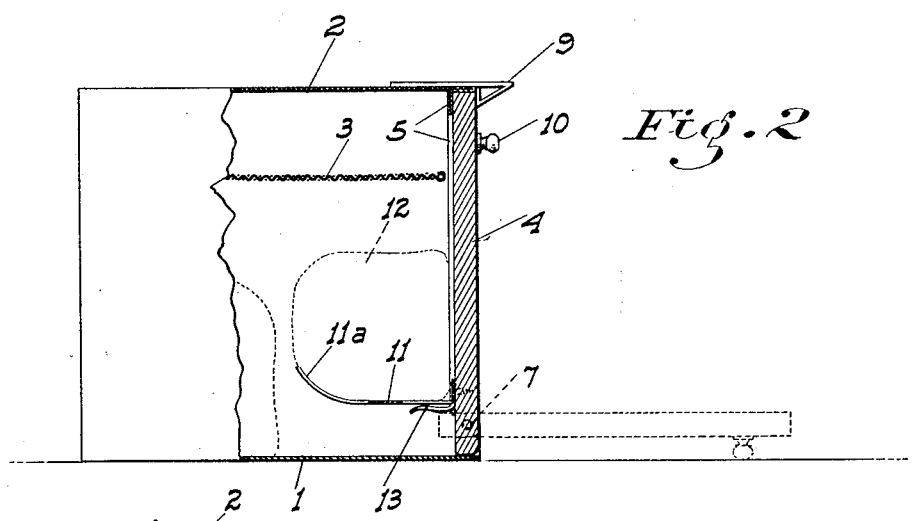
Fig. 2 is a side view of the box mainly in section showing the lid closed.

Projecting at right angles to the lid from the inner or cutting board face thereof and near its hinged or pivoted end is a rigid plate 11 which is centrally disposed relative to the width of the lid. This plate toward its outer end is provided with curved fingers 11a to follow the contour of the sides of a loaf 12 toward the top thereof and which project to adjacent the top of the loaf. The width of this plate relative to the total width of the lid and box is such as to enable a loaf to be drawn endwise between either side of the box and the adjacent edge of the plate. The plate at its base and at the back is formed with a spring clip member 13 to frictionally engage the blade of a bread cutting knife 14 of ordinary character, which when engaged by the clip then extends across the lid back of the plate, as plainly shown in Fig. 1.

By means of this arrangement it will be seen that if a loaf is initially placed on the lid and abutted at one side against the plate 11 it is in convenient position to be sliced; and if the lid is then raised to a closed position the loaf will be tilted on its side and will remain supported by the plate and retained in the front of the box until the lid is again opened. When this latter operation is carried out the loaf will be automatically brought out of the box and will again lie in a proper cutting position on the lid. The loaf being always retained toward the front of the box, permits another loaf to be placed in the back of the box if desired where it is not disturbed by the plate supported loaf, and for which this back loaf may be manually substituted at any time if desired.

The cake supporting shelf of course is positioned so as not to interfere with the changing of the loaf from one position to the other, and it may be omitted in the cheaper and smaller forms of the device if desired, and the extra loaf receiving depth of the box may also be eliminated in certain cases.

The bottom member 1 extends out under the inner end of the lid 3 when the latter is closed, thus serving as a catcher for crumbs which may fall when the lid is closed. It will also be seen that when the lid is thus closed, crumbs on the cutting surface thereof will be automatically deflected into the box during the closing operation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a bread box open to the front and having a downwardly-opening lid for said front hinged at the bottom on the box and arranged to serve also as a cutting board; a rigid plate projecting from the inner or cutting surface of the lid parallel to the bottom edge thereof to engage one side of a loaf placed on said surface of the lid.

2. In a bread box open to the front and having a downwardly-opening lid for said front hinged at the bottom on the box and arranged to serve also as a cutting board; a rigid plate projecting from the inner or cutting surface of the lid parallel to the bottom edge thereof to engage one side of a loaf placed on said surface of the lid, said plate being disposed near the hinged end of the lid whereby to maintain the loaf, when the lid is raised, adjacent the bottom of the box.

In testimony whereof I affix my signature.

FRED L. HAZELQUIST.